(12) United States Patent
Horst et al.

(10) Patent No.: US 12,155,749 B2
(45) Date of Patent: Nov. 26, 2024

(54) COMPUTER-IMPLEMENTED METHOD OF REPLACING A DATA STRING

(71) Applicant: COMFORTE AG, Wiesbaden (DE)

(72) Inventors: Henning Horst, Tussenhausen/Zaisertshofen (DE); Michael Horst, Wuthenow (DE)

(73) Assignee: COMFORTE AG (DE)

( * ) Notice: Subject to any disclaimer, the term of this patent is extended or adjusted under 35 U.S.C. 154(b) by 543 days.

(21) Appl. No.: 16/865,042

(22) Filed: May 1, 2020

(65) Prior Publication Data
US 2020/0351079 A1 Nov. 5, 2020

(30) Foreign Application Priority Data

May 3, 2019 (EP) .................... 19 172 578

(51) Int. Cl.
*H04L 29/06* (2006.01)
*H04L 9/06* (2006.01)
*H04L 9/32* (2006.01)

(52) U.S. Cl.
CPC .......... *H04L 9/0656* (2013.01); *H04L 9/3234* (2013.01)

(58) Field of Classification Search
CPC ............................ H04L 9/0656; H04L 9/3234
USPC ......................................................... 713/159
See application file for complete search history.

(56) References Cited

U.S. PATENT DOCUMENTS

| | | | | |
|---|---|---|---|---|
| 9,275,249 B1* | 3/2016 | Allen | ................... | G06F 21/6227 |
| 2012/0102143 A1* | 4/2012 | Mandre | ............... | H04L 63/0478 |
| | | | | 709/217 |
| 2014/0108813 A1 | 4/2014 | Pauker et al. | | |
| 2014/0150086 A1* | 5/2014 | Horst | ............... | G06Q 20/38215 |
| | | | | 726/18 |
| 2015/0043832 A1* | 2/2015 | Kubota | ................... | G06V 10/98 |
| | | | | 382/229 |
| 2017/0103214 A1* | 4/2017 | Dillard | ................ | G06F 11/3676 |
| 2018/0062832 A1* | 3/2018 | Hatcher | .............. | H04L 63/0428 |

OTHER PUBLICATIONS

Bartoli, "Inference of Regular Expressions for Text Extraction from Examples", 2016, IEEE, pp. 1-13 (Year: 2016).*
European Search Report, EP19172578.7, dated Oct. 28, 2019 (8 pages).

* cited by examiner

*Primary Examiner* — Piotr Poltorak
*Assistant Examiner* — Gregory A Lane
(74) *Attorney, Agent, or Firm* — Jaquez Land Greenhaus & McFarland; Bruce W. Greenhaus

(57) ABSTRACT

A computer-implemented method of replacing a security-relevant unencrypted data string by a placeholder. The steps involved include: providing a plurality of mutually different replacement tables, wherein specified in each of the plurality of replacement tables for each character of the alphabet is precisely one replacement character from the same alphabet and wherein the replacement characters in each of the plurality of replacement tables are all different from each other; receiving the security-relevant unencrypted data string, wherein the data string is formed from a plurality of characters of an alphabet; and generating the placeholder replacing the unencrypted data string, and outputting the placeholder. To provide a method which is distinguished by enhanced performance with comparable cryptographic security it is proposed. Generation of the placeholder includes the specifically identified steps.

17 Claims, 5 Drawing Sheets

$$S_k = \binom{0123456789}{4623150789}$$

COMPUTER-IMPLEMENTED METHOD OF REPLACING A DATA STRING

FIELD OF THE INVENTION

The invention concerns a computer-implemented method of replacing a security-relevant unencrypted data string by a placeholder. In that case the method includes the steps: providing a plurality of mutually different replacement tables, wherein specified in each of the plurality of replacement tables for each character of the alphabet is precisely one replacement character from the same alphabet and wherein the replacement characters in each of the plurality of replacement tables are all different from each other, receiving the security-relevant unencrypted data string, wherein the data string is formed from a plurality of characters of an alphabet, generating the placeholder replacing the unencrypted data string, and outputting the placeholder.

BACKGROUND OF THE INVENTION

Methods of replacing a security-relevant unencrypted data string by a placeholder are known in many different forms from the state of the art. Thus it is known, for example, to prepare a plurality of mutually different replacement tables wherein, for the specific replacement, a subset is selected from the plurality of replacement tables, for example, on the basis of a key, and the unencrypted data string is replaced by the placeholder on the basis of the selected subset of replacement tables. In that case each replacement table contains an association of each character of the alphabet, from which the characters of the unencrypted data string are taken, with a character of an alphabet of the placeholder.

Such a method can be used in a scenario of data processing, in which the security-relevant data string is replaced in a data set by a token as the placeholder before the data set is further processed in pseudonymised fashion. As an example of such a scenario mention may be made of an architecture for the processing of a cashless payment transaction, in which a payment transaction processor, by way of a data network, connects a multiplicity of points of sale as well as cash machines on the one hand, and a multiplicity of card providers and a multiplicity of payment settlement systems on the other hand, to a central server, wherein the server manages and controls the individual transactions.

It is found in that case there is the challenge that data sets which contain trustworthy data strings, in particular, sequences of digits identifying people like, for example, card or account numbers, have to be not only transmitted but also processed and stored. Such card or account numbers are also abbreviated in this application as PANs (Primary Account Numbers). In that case the stored data sets disposed on the server in processing have to be protected front access and viewing by third parties of the PANs contained therein in order to prevent misuse of the payment transaction system.

For the processing and storage of data sets which include PANs, methods and systems for tokenisation of the PANs received in plain text, that is to say, for replacement of a security-relevant unencrypted data string in the form of the plain text PAN by a random token uniquely associated with the PAN, were developed. As the tables with the association between the replaced PANs and the tokens are securely stored separately from the processing programs it is complicated and intricate for a third party to get tack from the data sets which arc being processed and which are pseudonymised by means of the tokens to the associated PANs. A corresponding architecture is described, for example, in European patent EP 2 735 991 B1.

A second possible application of such a method of replacing a security-relevant unencrypted data string by a placeholder is the encrypted transmission of a data string in a data set in the form of a message from a sender to a receiver. In that ease, for example, the sender is a cash machine which transmits the data set by way of a data network to a processing server as the receiver. In this example also a PAN can be replaced in the message by the placeholder, then sent and replaced again by the receiver by the original data siring. A prerequisite here is that the sender and the receiver have knowledge about the precise implementation of the replacement method, for example, by the exchange of a key. Accordingly, the sender can encrypt the PAN and the receiver can decrypt same.

SUMMARY OF EMBODIMENTS OF THE INVENTION

In comparison with the known methods of replacing a security-relevant unencrypted data string by a placeholder, a purpose of the present invention is to provide a method which is distinguished by enhanced performance with comparable cryptographic security.

According to an embodiment of the invention, that purpose is attained by the provision of a computer-implemented method of replacing a security-relevant unencrypted data string by a placeholder, wherein the method comprises the steps: providing a plurality of mutually different replacement tables, wherein specified in each of the plurality of replacement tables for each character of the alphabet is precisely one replacement character from the same alphabet and wherein the replacement characters in each of the plurality of replacement tables are all different from each other; receiving the security-relevant unencrypted data string, wherein the data string is formed from a plurality of characters of an alphabet: generating the placeholder replacing the unencrypted data string: and outputting the placeholder; wherein generation of the placeholder comprises the steps of:

1. selecting a subset from the plurality of replacement tables;
2. selecting a first substring with at least one character and a second substring with at least one further character from the data string;
3. replacing the at least one character of the first substring by a replacement character specified in a replacement table from the subset, wherein the replacement character depends on the second substring; and
4. repeating at least steps 2 and 3 until all characters of the data string have been replaced at least twice.

With the method according to this concept a security-relevant unencrypted data string is replaced by a placeholder, wherein replacement is format-maintaining in the sense that the placeholder has the same number of characters as the data string. In addition, the placeholder is formed from characters of the same alphabet as the original data string. Thai facilitates both further processing of a data set with the placeholder and also generation of the placeholder itself. It is appreciated that the same also applies for decryption, that is to say, replacement of the placeholder by the original security-relevant unencrypted data string.

The underlying idea of the replacement method according to this concept is to enhance cryptographic security by the choice of the replacement character which replaces a character of the data string depending on at least one further character of the same data string. For that purpose, the method involves selecting from the data string to be replaced, firstly, a first substring with at least one character to be replaced and a second substring with at least one further character. As an attacker does not know the characters of the data string to be replaced therefore, in particular, the characters of the second data string, he also cannot have any knowledge about the choice of the replacement character.

In addition, in accordance with the described embodiment, cryptographic security is enhanced by each character of the data string being replaced at least twice.

In accordance with the present application a replacement round or round denotes the implementation of replacement of a character of the first substring. In an embodiment a round has a plurality of subrounds, wherein the character is replaced afresh in each subround. In that case in the first subround of the replacement process at least one character of the original data string is replaced by a replacement character and in a second, and in each further subround, the replacement character is replaced afresh. The implementation of a round for each character of the data string is referred to as a pass in accordance with the present application. Accordingly, a complete pass includes as many rounds as the data string to be replaced has characters.

In an embodiment, therefore, multiple replacement of each character of the data string can be effected by, firstly, a character of the date string being replaced a plurality of times in a round with a plurality of subrounds before then the next character is also replaced a plurality of times in a round with a plurality of subrounds, and so forth, until finally the last character of the data string is replaced a multiple of times in a round with a plurality of subrounds. In such an embodiment the number of replacements is determined by the number of subrounds per round.

Alternatively, however it is also possible, for example, in a first pass for all characters of the date string to be successively replaced respectively singly in a round before all replacement characters are successively replaced afresh in each further pass. In such an embodiment the number of replacements of each character is determined by the number of passes.

All combinations of the above-described procedures are conceivable as long as each character of the date string was replaced at least twice after the conclusion of all rounds. In particular it is possible to break off the replacement without the last pass being completely concluded.

A dependency of the replacement character for the at least one character of the first substring on the second substring can be achieved by a series of mutually different measures which, however, can also be combined together. Two possible embodiments are described representatively hereinafter in the description.

The term, "a data string," in accordance with the present description is used to denote any kind of character sequence. A data set is composed of one or more such data strings. In that case the data strings in a data set can be differentiated from each other or marked in some other fashion, but they do not have to be. In particular, a data set can comprise a single character sequence which includes a plurality of data strings. A configuration of a data set in accordance with the present invention is a message which includes the unencrypted data string or the placeholder.

In an embodiment, a data set can be a message which describes a financial transaction and which, for example, includes information about location, subject, and price of the transaction. In such an embodiment the unencrypted data string, in accordance with the present application, can then be, in particular, at least one substring of a so-called Primary Account Number (PAN), that is to say, a number sequence identifying an account or a payment card. However, any other data string could be replaced by a placeholder with the same method and in that way securely transmitted and/or processed.

In an embodiment of the present invention selection of the subset from the plurality of replacement tables is effected in dependence on the at least one character of the second substring so that the replacement character for the at least one character of the first substring depends on at least one character of the second substring. On the assumption that an attacker does not know how the unencrypted data string replaced by the placeholder looked, the selection of the subset from the plurality of replacement tables, in which case then one or more of the replacement tables from the subset are used for the actual replacements, enhances the security in generation of the placeholder.

In an embodiment of the invention the initially provided replacement tables are respectively provided with an index uniquely identifying them. Then at least one character of the second substring, for example, the first character of the second substring, is considered, which determines the index of the at least one replacement table of the subset, that is to be selected from the total.

In a further embodiment, selection of the subset from the plurality of replacement tables is effected in dependence on a further, preferably random, parameter. Such a preferably random parameter, on which the selection of the subset depends, enhances security as the selection of the subset does not then generate two identical placeholders for two identical data strings, with a high level of probability.

In an embodiment, in addition to the at least one character of the second substring, that preferably random parameter influences the selection of the subset. In an embodiment in which the selection of the subset does not depend on at least one character of the second substring, such a parameter alone or in co-operation with other parameters as the at least one character of the second substring influences the select ion of the subset.

An example of the generation of such a random parameter are concepts known from cryptography, like salt and tweak. For example, it is possible to ascertain from a random input a hash value, the bytes of which also determine the subset from the plurality of replacement tables. For that purpose, for example, the hash value forms a base offset to the indices of the total amount of the plurality of replacement tables provided, wherein a modulo value, derived from the second substring, of the total number of the provided replacement tables is added to that base offset.

In an embodiment a base offset into the overall amount of the replacement tables is ascertained for each replacement round so that the selection of the subset depends, not only on the at least one character of the second substring but, in addition, on a further parameter. That base offset can be given, for example, by the order of the replacement round or by a random parameter. The position of the character considered of the second substring is added in the modulo alphabet of the total number of the provided replacement tables to the base offset. If, for example, 256 replacement tables are prepared, the alphabet is the Latin alphabet with 26 letters and the first character of the alphabet has the ordinal number 0. The first three characters, 'ABE,' of the second substring are considered and the base offset is 50. That results in the selection of a subset with the three tables Nos. 50, 51, and 54 from the overall amount of the provided replacement tables. With those three replacement tables of the subset the first character of the first substring could be successively replaced three times.

In a further embodiment a plurality of characters of the second substring jointly determine the index of the first replacement table of the subset by addition to a base offset modulo of the total number of the replacement tables provided. For each further subround the respective next table is selected. For example: alphabet of the numbers from 0 to 9, a total of 256 replacement tables, the first replacement table has the ordinal number 0, the second substring has the first three characters '367', those are considered, the base offset is 50, then the index of the first replacement table of the subset (50+367) mod 256=160, that is to say, the subset includes the tables with the indices 160, 161, and 162.

In an embodiment of the invention the selection of the subset from the plurality of replacement tables in step 1 is effected once before all characters of the substring are replaced a plurality of times, that is to say, before the first round of the first pass. In an embodiment in that case the subset includes a number of replacement tables, the number of replacement tables in the subset being at least equal to the number of characters of the data string multiplied by the number of replacements per character. Such an embodiment is used, for example, when a short data string with few replacement rounds is replaced by the corresponding placeholder. Before implementation of the actual replacement rounds the subset of all required replacement tables would be determined.

In a further embodiment of the invention the selection of the subset from the plurality of replacement tables in step 1 is effected before each round, wherein the subset includes at least one replacement table from the plurality of replacement tables. In an embodiment the subset includes a number of replacement tables equal to the number of subrounds, that is to say, the replacements in the round. In that way for each replacement round the subset of replacement tables to be used is selected immediately prior to implementation of the replacement or replacements.

In an embodiment of the present invention the first substring and the second substring together contain all characters of the data string. If the first substring always contains precisely one character then the second substring contains the rest of all characters of the data string to be replaced.

A further possibility of making the replacement character which replaces a character of the first substring dependent on the second substring is set forth hereinafter. In an embodiment of the invention, replacement of the at least one character of the first substring in step 3 includes: combining the first substring with the second substring to give a combination substring having a number of characters that is equal to the number of characters of the first substring; and replacing the characters of the combination string with the replacement characters specified in the at least one replacement table.

In this embodiment, unlike the above-described embodiment, die selection of the subset of replacement tables does not depend on the second substring but the at least one character of the first substring is combined with at least one character, which is not foreseeable for an attacker, of the second substring, to give a combination string which has the same number of characters as the first substring. Naturally that combination character depends on the second substring so that the respective replacement character for the combination character is also dependent on that second substring.

In an embodiment of the invention, for combining the first substring with the second substring to give a combination siring, the characters of the data string are so encoded that the characters of the data string are represented by a numerical identification of the position of the characters in the alphabet. If, for example, the basis adopted is the Latin alphabet, then all characters 'A' would be replaced by a '1' and all characters 'B' replaced by a '2' and so forth. That representation of the characters of the data string makes it possible to implement the combination of the first substring with the second substring by a modular linking between the position precisely of one character of the first substring in the alphabet and the position precisely of one character of the second substring in the alphabet. Such a modular linking (also referred to as a modular operation) is, for example, modular addition or modular multiplication. Figuratively speaking the modular linking of a character from the first substring and a character from the second substring can be understood as 'rotation' of the respective replacement table in dependence on the character of the second substring.

In an embodiment of the invention after replacement of the at least one character of the first substring by the replacement character, the positions of the first already replaced substring and the second substring are exchanged in the data string. In that way, repealed replacement of the characters of the data string can be structured in a simple fashion.

In an embodiment of the present invention the first substring comprises precisely one character. In that case, in an embodiment a number of subrounds of the replacement is performed, which is equal to the number of characters in the second substring.

In an embodiment of the invention the preparation of each one from the plurality of replacement tables for each character of the alphabet includes random selection of precisely one replacement character from the alphabet by means of a random generator.

In an embodiment, for provision of the plurality of replacement tables, they are randomly generated and stored. For that purpose, in an embodiment the provision of each one from the plurality of replacement tables includes generation of the replacement table by means of a random generator. In other words the provision of each replacement table in this embodiment includes the generation of a random permutation of the alphabet, wherein the permuted characters are associated with the characters of the alphabet in the original sequence. For example, a random permutation or mixture of the alphabet and therewith the replacement table can be generated by means of a Fisher-Yates method (also referred to as the Knuth method).

In a further embodiment of the invention, the provision of each one from the plurality of replacement tables includes generation of the replacement table by means of a pseudo-random stream of numbers on the basis of which a permutation of the alphabet is generated. In other words, in this embodiment the provision of each replacement table includes the generation of a pseudo-random permutation of the alphabet wherein the permuted characters are associated with the characters of the alphabet in the original sequence.

In an embodiment for generation of the replacement tables in that way the pseudo-random stream of numbers is derived from a key with a plurality of characters. For example, by means of a block cipher like, for example, AES from a key it is possible to generate a stream of pseudo-random numbers, which is then used in turn for generating a permutation of the alphabet to provide a replacement table.

In an embodiment of the invention for replacement of the placeholder by a security-relevant unencrypted data string the steps performed for generating the placeholder from the unencrypted data suing are inverted.

In an embodiment of the method, the data siring is a constituent part of a data set to be processed in a processing apparatus, wherein replacement of the data string by the placeholder is effected in a security device, wherein reception of the data string is reception of the data string in the security device from the processing apparatus, and wherein the output of the placeholder includes transfer of the placeholder from the security device to the processing apparatus.

A processing apparatus in accordance with the present application is any apparatus but, in particular, a program or a program portion, which processes the data set and in same, for example, performs replacement of the unencrypted data string by the token and vice-versa. A processing apparatus in this sense can be, for example, a client software but also a sender for the transmission of the data set by way of a data network.

In an embodiment the processing apparatus is an intercept device on a data channel, which carries out the steps: intercepting a data set transmitted by way of the data channel in a first direction; identifying the security-relevant unencrypted data string in the intercepted data set: transferring the security-relevant unencrypted data string to the security device for generating the placeholder; receiving the placeholder from the security device; exchanging the unencrypted data string in the data set by the placeholder; and forwarding the data set with the placeholder by way of the data channel.

The idea of such an intercept device is to monitor the input/output channel of a further device for processing the data set and without intervention in the other devices of the system in all data sets which contain unencrypted security-relevant data strings, to replace same by placeholders.

The data sets which are pseudonymised by the intercept device and from which the security-relevant data string can no longer be derived are then processed by the further device, wherein for that the replacement of the security-relevant unencrypted data siring by the placeholder does not lead to any change in processing as the placeholder replaces the unencrypted data string in format-maintaining relationship.

In an embodiment of the invention, the computer-implemented method described in embodiments hereinbefore is a tokenisation method. In that case the security device is a tokenisation device and the placeholder is a token. Replacement of the data string by the token is effected in the tokenisation device, wherein the data siring is received from the processing apparatus and output of the placeholder includes transfer of the token to the processing apparatus.

The term, "tokenisation device," in accordance with the present application, is used to denote a device, but in particular a program or a program portion, which performs generation of the token and restoration of the unencrypted data string from the token.

In particular, the data set with the token is stored in the further device. The further device is, for example, a transaction data storage means in a server for a cashless payment transaction system.

So that data sets which are returned or output by the further device can be further processed again with the unencrypted data string the intercept device in an embodiment in addition performs the following steps: intercepting a data set transmitted by way of the data channel in a second direction, wherein that is preferably in opposite relationship to the first direction: transmitting the data set; identifying the token in the intercepted data set; transferring the token to the tokenisation device for restoration of the unencrypted data string; receiving the unencrypted data string from the tokenisation device; replacing the token in the data set by the unencrypted data string; and forwarding the data set with the unencrypted data string by way of the data channel.

In an embodiment of the invention, identification of the unencrypted data string or the token in a data set includes determining the length and the position of the unencrypted data string of the token in the data set.

In a further embodiment of the invention, the computer-implemented method of securely storing a data string in accordance with the present application is carried out in a server for a cashless payment transaction system.

In an embodiment the method provides that the token is not transmitted to other devices of the payment transaction system. If, therefore, other devices of the payment system than the server require the unencrypted data string, that is to say, for example, a PAN, then firstly the unencrypted data string is restored by means of the method according to the invention from the token and same is then communicated.

Other embodiments however are also possible in which the tokens themselves can be transmitted to other devices of the payment transaction system. If those devices then at a later time require the unencrypted data string for given processing steps then restoration of the unencrypted data string is effected in the tokenisation device. The other devices of the system transmit the token for restoration of the unencrypted data string to the tokenisation device or acquire access in some other way thereto.

In a further embodiment of the invention the computer-implemented method described in embodiments hereinbefore is part of a transmission method for the encrypted transmission of a data siring from a sender to a receiver by way of a data network. In that situation the security device is an encryption device and the processing apparatus is a sender, wherein the sender transmits the data set with the placeholder by way of a data network to a receiver, wherein the receiver transfers the placeholder to a decryption device, wherein the decryption device receives a placeholder from the receiver, replaces the placeholder by the original unencrypted data string, and transfers the data string to the receiver. It will be appreciated that in such an embodiment the encryption device at the sender side and the decryption device at the receiver side must have knowledge of a key as was described hereinbefore in embodiments and applications thereof.

In an embodiment the sender is a cash dispenser and the receiver is an authorisation server, for example, the authorisation server of a payment transaction processor. In that case in an embodiment the unencrypted data string is a PAN in a data set which, for example, describes a transaction. The data set then forms the message to be transmitted from the sender to the receiver by way of the data network. By way of replacement of the original data string by the placeholder the data set is transmitted in pseudonymised form and at the server side that pseudonymisation has to be undone again prior to further processing of the data set.

Insofar as the above-described embodiments can be at least partially implemented, with a software-controlled data processing apparatus being used, it is apparent that a computer program which provides such a software control and a storage medium on which such a computer program is stored are to be considered as aspects of the invention.

BRIEF DESCRIPTION OF THE DRAWING

Further advantages, features, and possible uses of the present invention will be apparent from the detailed description hereinafter of an embodiment and the accompanying drawing. It will be appreciated that the illustrated embodiments are not limited to the precise illustrated arrangements and functionalities. Unless otherwise specified the same references denote the same or similar elements in different figures.

DETAILED DESCRIPTION OF EMBODIMENTS OF THE INVENTION

The implementation described hereinafter of the method according to the present concept of replacing a security-relevant unencrypted data string by a placeholder can be used in various application scenarios. In a first embodiment the method according to the invention is used to tokenise a data string from a data set so that the associated data set can be further processed in pseudonymised fashion. In a further embodiment the method according to the invention is used to encrypt a data string in a data set in the form of a message prior to transmission from a sender by way of a data network to a receiver and to encrypt the placeholder again at the receiver.

Firstly therefore the method of replacing the data string by the placeholder is now described in abstract terms, in which respect the differences between the uses for tokenisation and for encryption for data transmission of a data string are discussed. The two application scenarios are then finally described in detail.

Implementation is based on a data string 1 to be replaced by the placeholder 2, of a length of n=8 characters. All characters of the data string are taken from a cipher alphabet A of the magnitude a=10. In the example discussed here the alphabet A is a set often numbers from '0' to '9,' wherein the unencrypted data siring for the sake of simplicity reads '12345678'. For internal representation and processing of each data siring it is re-coded by the representation of each character in the form of its integer position within the alphabet. In that respect '0' denotes the first position and '9' denotes the last. In this simple example therefore, the representation in the form of the integer position corresponds to the original representation of the characters by the characters of the alphabet A.

Figure 1:
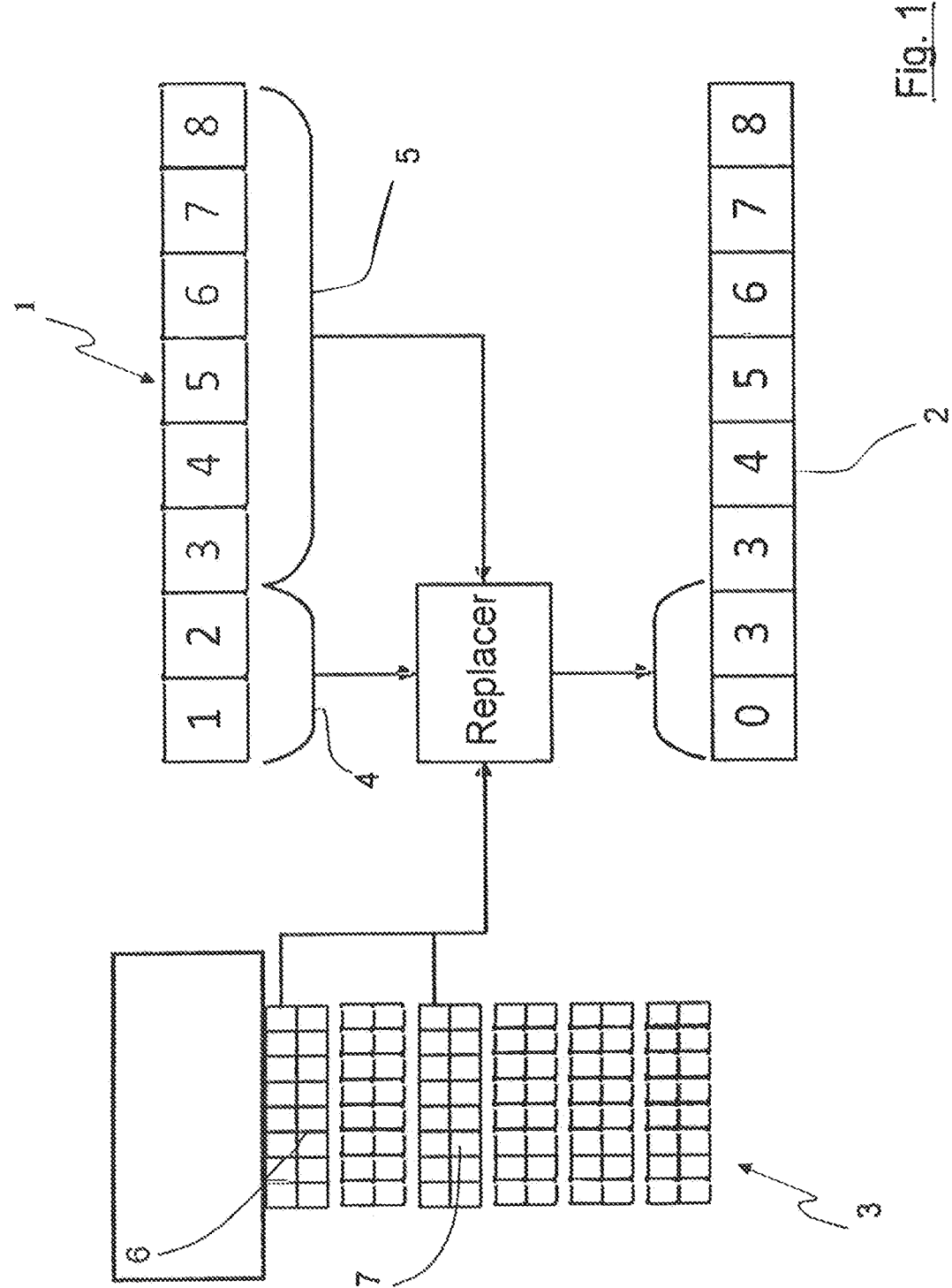
FIG. 1 is a diagrammatic view of replacement of the characters of a first substring of a data siring in a replacement round.
Figure 2:
FIG. 2 is a diagrammatic view of a replacement table.

In the example being discussed as shown in FIG. 1, six replacement tables 3 were generated to start with. Each replacement table contains a random permutation of the alphabet A, wherein precisely one character from the permuted alphabet A is specified for each character from the alphabet A of the data string. That replacement table is easily invertible for restoration of the data siring from the placeholder. An example of such a replacement table 3 is diagrammatically shown in FIG. 2.

If the described method serves for tokenisation then the replacement tables can be formed by means of a random generator and then stored as a tokenisation secret in the tokenisation device. If, in contrast, the illustrated method is used for encryption of a communication between a sender and a receiver then the pairs of replacement tables are randomly formed at the sender end and the receiver end front a key in such a way that the sender and the receiver have the same replacement tables or the inverts thereof.

In the illustrated implementation of the described method, the data siring to be replaced is divided into a first substring 4 and a second substring 5 as in the case of an unbalanced Feistel network. In that ease the first substring contains the first two characters of the data string 1 and the second substring 5 contains all other characters of the data string.

To replace the characters of the data string 1 two replacement tables 6, 7 are now selected as a subset from the plurality of replacement tables 3 prior to each replacement round, that is to say, prior to single replacement of each individual character of the data string. In that case the first replacement table 6 serves for replacement of the first character of the first substring 4 and the second replacement table 7 serves for replacement of the second character of the first substring 4.

The selection of the subset 6, 7 from the plurality of pairs of replacement tables 3 is also effected in dependence on the purpose for which the method is implemented. In an implementation for encryption of the data string 1 for the encrypted transmission of the data siring from a sender to a receiver by way of the data network that is again based on the key which was previously the basis for preparation of the plurality of pairs of replacement tables. Upon tokenisation that key is generated within the tokenisation device and stored as part of the tokenisation secret together with the plurality of replacement tables 3.

To implement complete replacement of all characters of the data string the replacement characters which replace the two characters of the first substring 4 are displaced to the end of the data siring 1 so that then two further characters, in the present example the two numbers '3' and '4,' form the first substring 4 to be replaced. All replacement operations in that pass, that is to say, until all characters have been replaced for the first time, arc carried out with the two selected replacement tables 6, 7. Before each further pass a subset with two replacement tables from the plurality of replacement tables 3 is selected afresh.

In all embodiments discussed herein each replacement character which replaces a character of the first substring 4 depends on the second substring 5. In that way the result of the replacement operation depends on something that an attacker cannot know.

In a variant the second substring 5 is used for selection of the subset from the plurality of replacement tables. For that purpose, all provided replacement tables 3 are respectively provided with a unique index, that is to say, the replacement tables 3 are numbered consecutively, the first table being denoted by 0. In the described variant the order of the respective pass is used as a base offset into the total amount of the tables. That is to say, a counter is increased by one for each pass. Consequently, the base offset in the first round is 0, in the second round 1, in the fiftieth round 49, and so forth. Added to that base offset is the position of the character being considered of the second substring in the alphabet modulo of the total number of the replacement tables provided. In that case the first position of the alphabet is again denoted by 0. In the example being considered six replacement tables 3 are provided and the cipher alphabet has nine characters. In the first pass that leads to selection of the table with the ordinal number 3 (=0+3 mod 6) from the total amount of the replacement tables 3, in the second pass selection of the table with the ordinal number 5 (=1+4 mod 6), and in the third pass selection of the table with the ordinal number 1 (=2≡mod 6).

Figure 3:
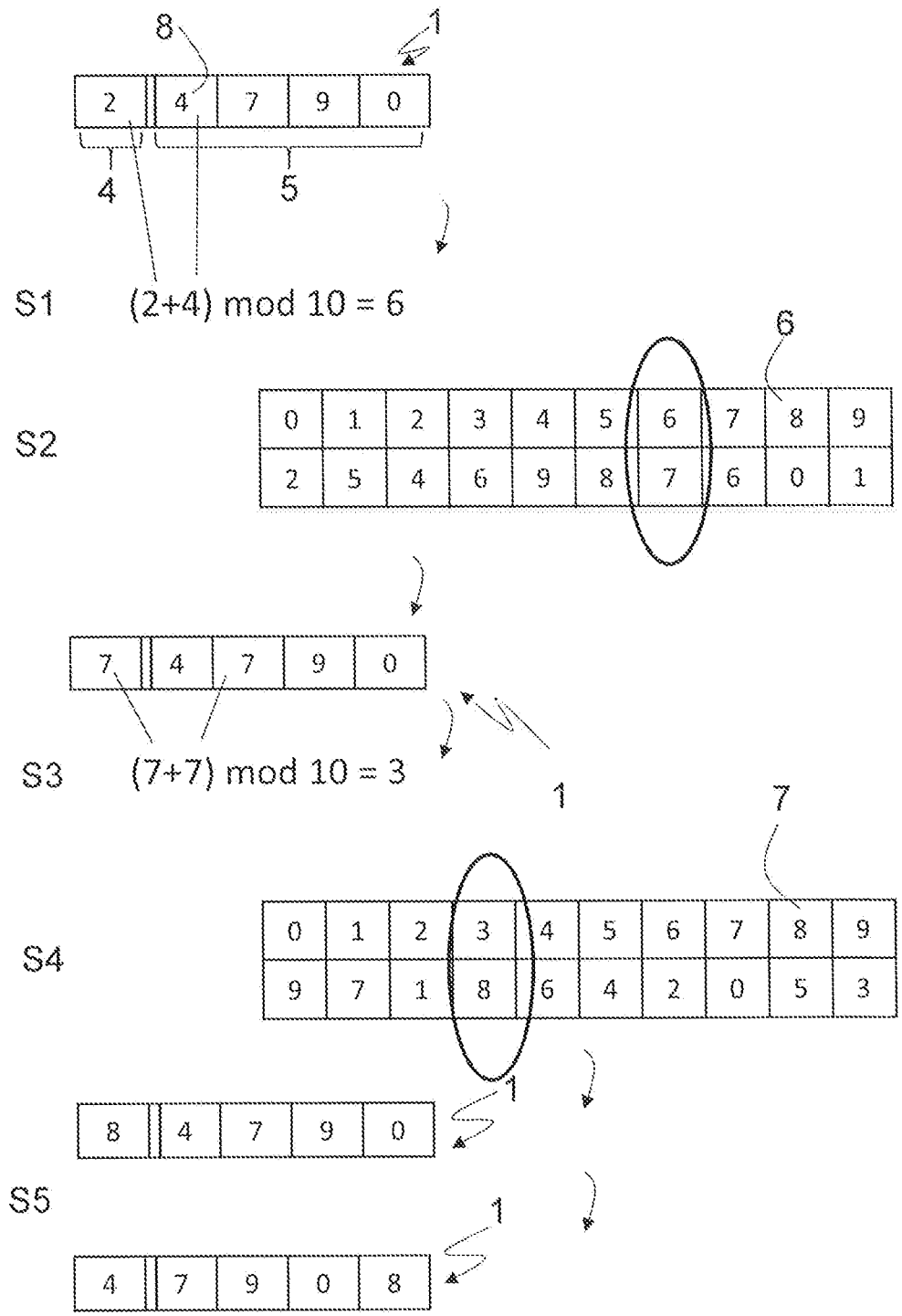
FIG. 3 is a diagrammatic view of an embodiment.

In a further variant which is now described with reference to FIG. 3, the precisely one character to be replaced of the first substring 4 is replaced a plurality of times before the next and thereafter each further character of the data string 1 is replaced twice. In accordance with the present application in this variant each round in the replacement has two subrounds. FIG. 3 shows thereof by way of example the double replacement of the first character of the data string 1. The data string 1 comprises five characters of the alphabet A of the numbers '0' to '9,' namely '23790'. For the replacement operations a representation of the characters is used that corresponds to the integer position thereof in the alphabet. The integer positions of the characters in the alphabet begin with the ordinal number 0.

Before the beginning of each round, that Is to say, before double replacement of each character, a subset with a number of replacement tables equal to the number of subrounds is selected from the amount of the provided replacement tables (not shown in FIG. 3). In the present case therefore two replacement tables 6, 7 are respectively selected for the replacement of each character. The characters are also encoded in those replacement tables 6, 7 in the form of their integer position in the alphabet A.

Now in step S1 the one character of the first substring 4 is modularly added to the first character 8 of the second substring 5 to form a combination character. The combination character is consequently in the selected example (2+4) mod 10=6. The combination character is then replaced by means of the first replacement table 6 in step S2. The replacement character specified in the replacement table 6 for the character at the position 6 of the alphabet is '7'. That replaces the '2' in the first substring of the data string 9. Now in steps S3 and S4 the character of the first substring 4 is replaced once again, this time using the second replacement table 7 from the subset. To form the replacement character in die second subround the character of the first substring 4 is modularly added to the second character of the second substring 5.

As now the first character of the data string has been replaced twice that replaced first character is displaced in step S5 to the end of the data string 1 and the next character of the string forms the character of the first substring 4 and is replaced twice, as was described hereinbefore for steps S1 to S4.

In a variant each character could be replaced in total four times in a round (four subrounds), the combination character being successively formed with all four characters of the second substring.

By virtue of the modular addition of the character of the first substring 4 to a respective character of the second substring 5 the selection of the replacement tables 6, 7 used for the replacement from the plurality 3 of replacement tables now no longer depends on the second substring 5. Instead, however, the specific replacement characters which replace the respective character of the first substring 4 in this variant depend directly on the first two characters of the second substring 5.

Figure 4:
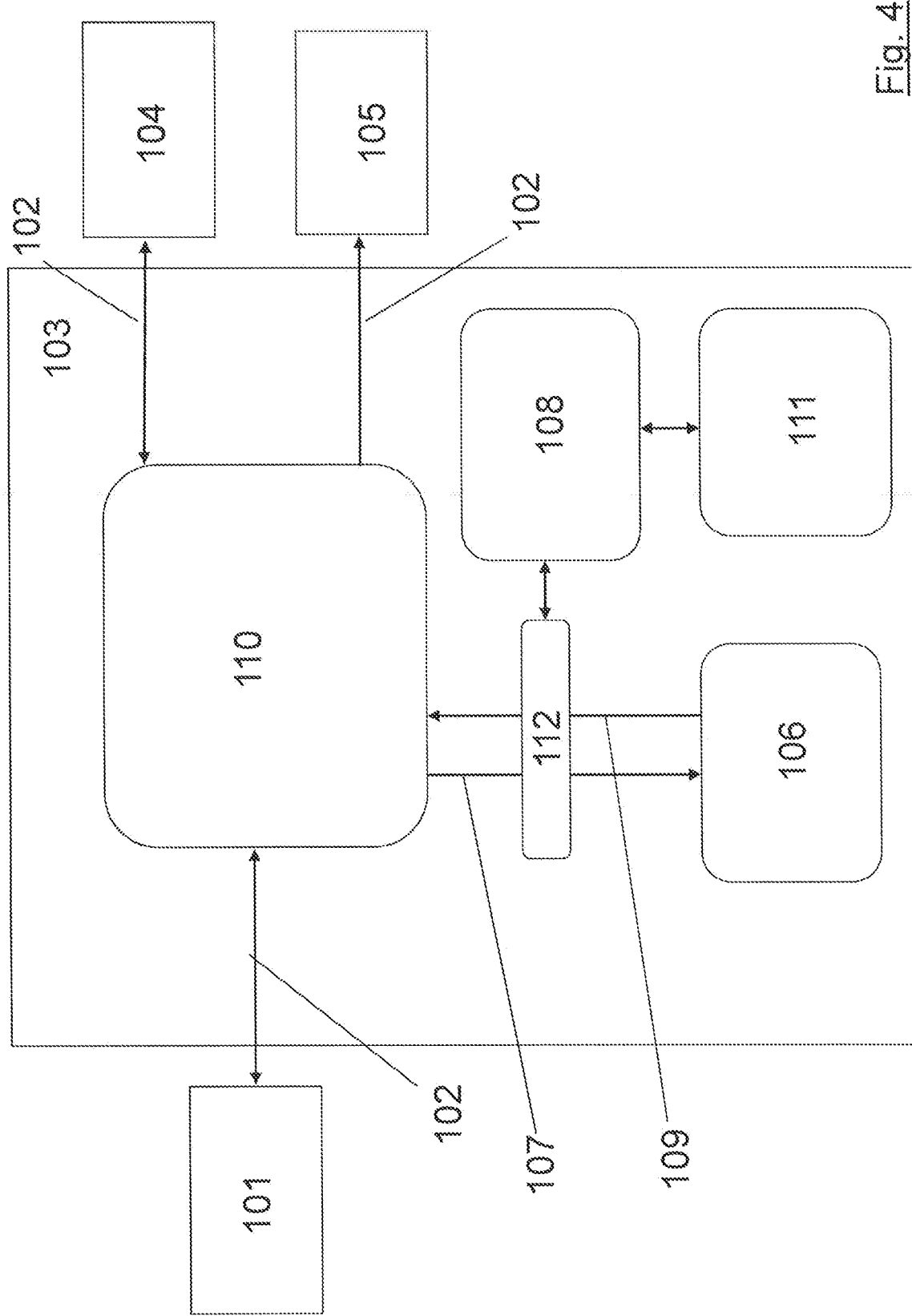
FIG. 4 is a block diagram of a payment transaction processor system with a method according to an embodiment of replacing PANs by tokens.

FIG. 4 shows a block diagram of a payment transaction processor system in which the computer-implemented method according to the concept of replacing a security-relevant unencrypted data siring is used.

The illustrated payment transaction processor system comprises a plurality of checkout systems 101, of which one is shown in FIG. 4. The checkout system 101 is connected to a central server 103 by way of a network connection 102. That in turn is connected by way of network connections 102 both to credit card providers 104 and also to the actual payment settlement system or systems 105.

In the illustrated embodiment the server has a central processing unit 110, an intercept device 112, a transaction data storage means 106, a tokenisation device 108 and a vault 111 for the tokenisation secret.

From the checkout systems 101 the server 103 receives information by way of the network connection 102 about the transaction to be performed. That information includes in particular the (credit) card number of the purchaser and information relating to the price, the settlement lime of the purchase, and similar. In that case the information about the transaction is in the form of a message transmitted by way of the network connections 102 from and to the server 103. Such a message is a data set in the sense of the present application. The information about the transaction made can be passed, on the one hand, from the central processing unit 110 to the server 103 directly, that is to say, without intermediate storage, to the credit card provider 104 or the payment settlement system 105. In that case forwarding is effected in plain text, that is to say, unencrypted, from the viewpoint of the system implemented on the server 103. That however only means that the server 103 itself does not effect any encryption for that communication. Rather the channels 102 from and to the server 103 are protected by proprietary systems for them. For example, the networks 102 are in the form of VPN channels.

The object of the central processing unit 110 implemented on the server 103 is to process the transaction information on the basis of its high availability and possibly to store it until the corresponding devices of the credit card provider 104 and the systems 105 are also available again. In addition, storage of the transaction information is usually effected for later settlement of claims and for the cumulative forwarding to the payment settlement systems 105.

To ensure the greatest possible security in respect of the transaction data upon handling in the server 103, all PANs contained in the transaction data, which here form the unencrypted data string in accordance with the present application, are replaced by tokens as replacement characters prior to storage of the data in the transaction data storage means 6. For that purpose the input path 107 into the transaction data storage means 106 like also the output data path 109 from the transaction data storage means 106 is monitored by the intercept device 112 (that is a processing device in accordance with the present application). The transaction data storage means 106 forms a further device for processing the data set in the sense of the present application.

All data sets to be stored, which contain a PAN, that is to say, a security-relevant unencrypted data siring, on the input data path 107, are intercepted by the intercept device 112. The data set is analysed and the unencrypted data string contained therein is transmitted to the tokenisation device 108 (also referred to as a tokenisation engine). The unencrypted data string is received by the tokenisation device 108 and replaced by a token. The token is then transferred again to the intercept device. Thereafter in the intercepted data set the intercept device replaces the unencrypted data string by the token and outputs the secure data set modified in that way to the transaction data storage means 106 for storage of the data set.

If, conversely, a data set is to be read out of the transaction data storage means 6 and provided to the central processing unit 110 then, firstly, the token of the data set stored in the transaction data storage means has to be replaced again by the unencrypted data string.

For that purpose all data sets read out of the transaction data storage means are intercepted on the output data path 109 by the intercept device 112. The data set is analysed and the token contained therein is transferred to the tokenisation device 108.

The token is received by the tokenisation device 108 and replaced again by the associated unencrypted data string. The unencrypted data string is then transferred again to the intercept device 112. Thereafter the intercept device 112 replaces the token in the data set which is read out of the transaction data storage means 106 and intercepted by the unencrypted data string and outputs the data set modified in that way to the central processing unit 110 for further processing of the data set. Such further processing includes, in particular, routing of a message with the data set to a card provider 104 or a payment settlement system 105.

It has been found that there is the advantage with this architecture that the PANs relating to the individual transactions are not in plain text in the transaction data storage means 106 but are replaced by tokens. An attack on the transaction data storage means 106 therefore never gives the information about the PANs so that such an attack remains ineffectual. To ensure the greatest possible security the actual tokenisation device 108 and the replacement tables which are used for replacements and which are stored in the so-called vault 111 are implemented separately from each other.

The above-described embodiment of the replacement method is carried out in the tokenisation device 108.

Figure 5:
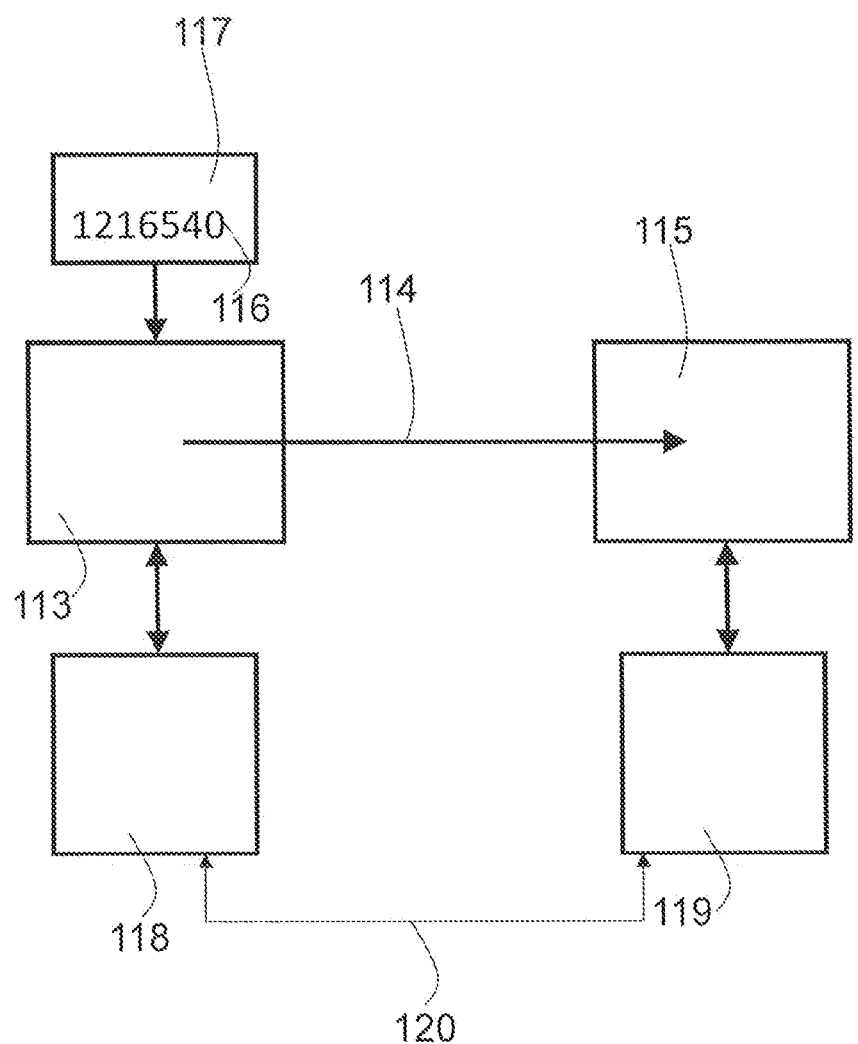
FIG. 5 is a diagrammatic view of a system for the transmission of transaction data from a cash machine to a server with a method according to an embodiment of replacing PANs by placeholders.

FIG. 5 shows a diagrammatic view of a system for secure transmission of transaction data from a cash machine 113 as the sender by way of a data network 114 to an authorisation server 115 of a payment transaction processor. The computer-implemented method according to the invention of replacing a security-relevant unencrypted data string in the form of a card number 116 of a credit card 117 is used in the system. The message transmitted by way of the data network 114 is a data set which describes a transaction and includes the card number 116. To pseudonymise the transaction during transmission and thus to protect it from an attack from the outside the card number is transferred to an encryption device 118 and there replaced by a placeholder. The pseudonymisation is nullified again in the server 115. For that the placeholder is transferred to a decryption device 119, replaced by the original card number 116, and then the data set with the unencrypted card number is subjected to further processing. A prerequisite for successful decryption is the exchange 120 of a key, on which both replacement of the original card number 116 in the encryption device 118 by the placeholder and also replacement of the placeholder by the original card number 116 in the decryption device 119 are based.

What is claimed is:

1. A computer-implemented method of replacing a security-relevant unencrypted data string by a placeholder, comprising the steps of:
    a) providing a plurality of mutually different replacement tables,
        wherein specified in each of plurality of replacement tables for each character of an alphabet, is a cross-reference to precisely one replacement character from the same alphabet, and
        wherein the replacement characters in each of the plurality of replacement tables are all different from each other;
    b) receiving the unencrypted data string,
        wherein the unencrypted data string is formed from a plurality of characters of the alphabet;
    c) generating the placeholder replacing the unencrypted data string,
        wherein generating the placeholder includes:
        i) selecting a subset from the plurality of replacement tables;
        ii) selecting a first substring with at least one character and a second substring with at least one further character from the unencrypted data string;
        iii) replacing the at least one character of the first substring by a replacement character specified in a replacement table from the subset,
            wherein the replacement character depends on the second substring; and
        iv) repeating at least ii) and iii) until all characters of the unencrypted data string have been replaced at least twice; and
        v) outputting the placeholder;
        wherein selecting the subset from the plurality of replacement tables in a) is dependent on a random parameter alone; and
        wherein selecting from the plurality of replacement tables in i) is not dependent on the second substring.

2. The computer-implemented method according to claim 1,
    wherein selection of the subset from the plurality of replacement tables is effected in dependence on a further parameter.

3. The computer-implemented method according to claim 1,
    wherein selection of the subset from the plurality of replacement tables in a) is effected before each performance of ii) and iii),
    wherein the subset contains at least one replacement table from the plurality of replacement tables.

4. The computer-implemented method according to claim 1,
    wherein the first substring and the second substring together contain all characters of the data string.

5. The computer-implemented method according to claim 1, wherein replacement of the at least one character of the first substring in iii) comprises:
    combining the first substring with the second substring to give a combination substring having a number of characters that is equal to the number of characters of the first substring; and
    replacing the characters of the combination string with the replacement characters specified in the at least one replacement table of the subset.

6. The computer-implemented method according to claim 1,
    wherein the characters of the data string are so encoded that the characters of the data string are represented by a numerical identification of the position of the characters in the alphabet.

7. The computer-implemented method according to claim 5, wherein combining the first substring with the second substring includes a modular linkage between the position precisely of one character of the first substring in the alphabet and the position precisely of one character of the second substring in the alphabet.

8. The computer-implemented method according to claim 7,
wherein after replacement of the characters of the first substring by the replacement characters, the positions of the first already replaced substring and the second substring are exchanged in the data string.

9. The computer-implemented method according to claim 1,
wherein the first substring consists of precisely one character.

10. The computer-implemented method according to claim 1,
wherein the provision of each one from the plurality of replacement tables includes generation of the replacement table by means of a random generator.

11. The computer-implemented method according to claim 1,
wherein the provision of each one from the plurality of replacement tables includes generation of the replacement table by means of a pseudo-random stream of numbers, on the basis of which a permutation of the alphabet is generated.

12. The computer-implemented method according to claim 11,
wherein the pseudo-random stream of numbers is derived from a key with a plurality of characters.

13. The computer-implemented method according to claim 1,
wherein replacement of the placeholder by the unencrypted data string is performed in an order that is inverted from an order for generating the placeholder from the unencrypted data string recited in claim 1.

14. The computer-implemented method according to claim 1,
wherein the unencrypted data string is a constituent part of a data set to be processed in a processing apparatus;
wherein replacement of the unencrypted data string by the placeholder is effected in a security device,
wherein receiving the data string is reception of the unencrypted data string in the security device from the processing apparatus, and
wherein outputting the placeholder includes transfer of the placeholder from the security device to the processing apparatus.

15. The computer-implemented method according to claim 14,
wherein the security device is a tokenisation device and the placeholder is a token.

16. The computer-implemented method according to claim 14,
wherein the security device is an encryption device and the processing apparatus is a sender,
wherein the sender transmits the data set with the placeholder by way of a data network to a receiver,
wherein the receiver transfers the placeholder to a decryption device,
wherein the decryption device receives the placeholder from the receiver, replaces the placeholder by a data string, and transfers the unencrypted string to the receiver.

17. A computer-implemented method of replacing a security-relevant unencrypted data string by a placeholder, comprising:
a) providing a plurality of mutually different replacement tables, wherein specified in each of plurality of replacement tables for each character of an alphabet, is across-reference to precisely one replacement character from the same alphabet, and wherein the replacement characters in each of the plurality of replacement tables are all different from each other;
b) receiving the unencrypted data string, wherein the unencrypted data string is formed from a plurality of characters of the alphabet; c) generating the placeholder replacing the unencrypted data string, wherein generating the placeholder includes:
i) selecting a subset from the plurality of replacement tables, the subset having a number of replacement tables that is equal to a number of subrounds to be performed during generation of the placeholder, the selection depending on a random parameter alone; and wherein selecting from the plurality of replacement tables is not dependent on a second substring;
ii) selecting a first substring with at least one character and the second substring with at least n additional characters, where n is an integer value greater than one, the first and second substrings being selected from the unencrypted data string;
iii) performing a multi-replacement of the at least one character of the first substring by n replacement characters,
wherein the n replacement characters are determined by:
A) modularly adding the first character of the first substring to the first character of the second substring to form a first combination character,
B) replacing the first combination character by means of a first replacement table of the selected subset of replacement tables to determine a first of the n replacement characters,
C) replacing the first character of the first substring with the first of the n replacement characters,
D) modularly adding the replaced first character of the first substring to the next character of the second substring to form a next combination character,
E) replacing the next combination character by means of a next replacement table of the selected subset of replacement tables to determine a next of the n replacement characters,
F) replacing the first character of the first substring with the next of the n replacement characters,
G) repeating iv through vi until the first character of the first substring has been replaced with the nth replacement character, and
iv) displacing the nth replacement character to the end of the unencrypted data string such that the next character of the unencrypted data string forms the first character of the first substring,
v) repeating at least c until all characters of the unencrypted data string have been replaced by the respective nth replacement character; and
vi) outputting the placeholder.

* * * * *